Oct. 19, 1954     E. J. FREOUF     2,692,061
HAY STACKER

Original Filed Jan. 26, 1949     2 Sheets-Sheet 1

Inventor
Emanuel J. Freouf
By John N. Randolph
Attorney

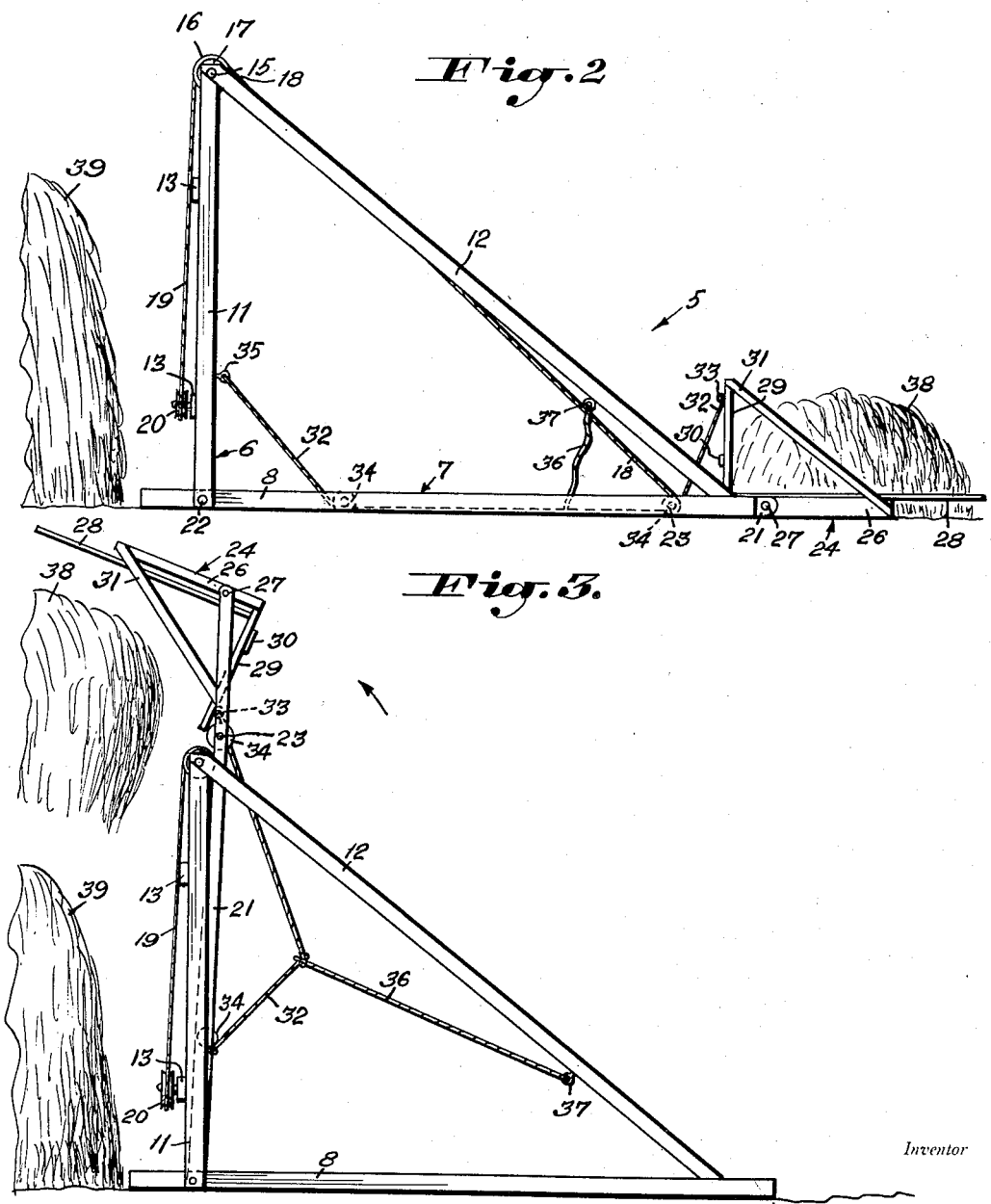

Patented Oct. 19, 1954

2,692,061

UNITED STATES PATENT OFFICE 2,692,061

HAY STACKER

Emanuel J. Freouf, Martin, S. Dak.

Substituted for abandoned application Serial No. 72,889, January 26, 1949. This application February 19, 1954, Serial No. 411,341

2 Claims. (Cl. 214—140)

This application is a substitute for my prior application, Serial No. 72,889, filed January 26, 1949, and now abandoned.

This invention relates to a hay stacker for use with power sweeps and by means of which the hay is conveyed onto the stacker head to be lifted and pitched by the head onto the top of a haystack, adjacent to which the stacker is positioned.

The usual hay stacker or combination sweep and stacker is provided with a head by means of which the hay is elevated and then released to drop onto a haystack. However, such devices drop the load of hay in a packed condition repeatedly on substantially the same point of the stack and so that the hay has a tendency to slide downwardly therefrom along the side of the stack, nearest the stacker, frequently making it difficult for the stacker to elevate subsequent loads of the hay and invariably dropping the hay packed in the condition in which it is swept up making it very difficult to later pitch the hay out of the stack.

It is a primary object of the present invention to provide a hay stacker wherein the hay will be thrown from the stacker head onto the top of a stack and so as to separate and spread the hay over the top of the haystack due to the fact that different parts of each load of hay carried by the stack is subjected to different amounts of force in being thrown from the stacker head and thereby the hay is readily separated and spread substantially evenly over the top of the haystack.

Another object of the invention is to provide a hay stacker of extremely simple construction having means for swingably raising a fork or stacker head and whereby said head will be maintained in substantially a horizontal position until it approaches the uppermost position of its movement at which time the head will be swung or rocked rapidly relatively to its support for effectively throwing the hay therefrom onto the top of the stack.

Another object of the invention is to provide a hay stacker wherein the stacker head or fork is initially swung relatively to a supporting frame, around one pivot point and subsequently and while still swinging relatively to said first mentioned pivot, is swung more rapidly on a second pivot for throwing the hay therefrom and for separating and distributing the thrown hay.

Still another object of the invention is to provide a hay stacker of extremely simple construction capable of being economically manufactured and sold and which will efficiently function to accomplish its intended result.

Various other objects and advantages of the invention will hereinafter become more fully apparent from the following description of the drawings, illustrating a preferred embodiment thereof, and wherein:

Figure 2 is a side elevational view thereof showing the stacker head or fork in a fully lowered position, and Figure 3 is a view similar to Figure 2 but showing the stacker head in a fully elevated position and immediately after the hay has been thrown therefrom.

Figure 1:
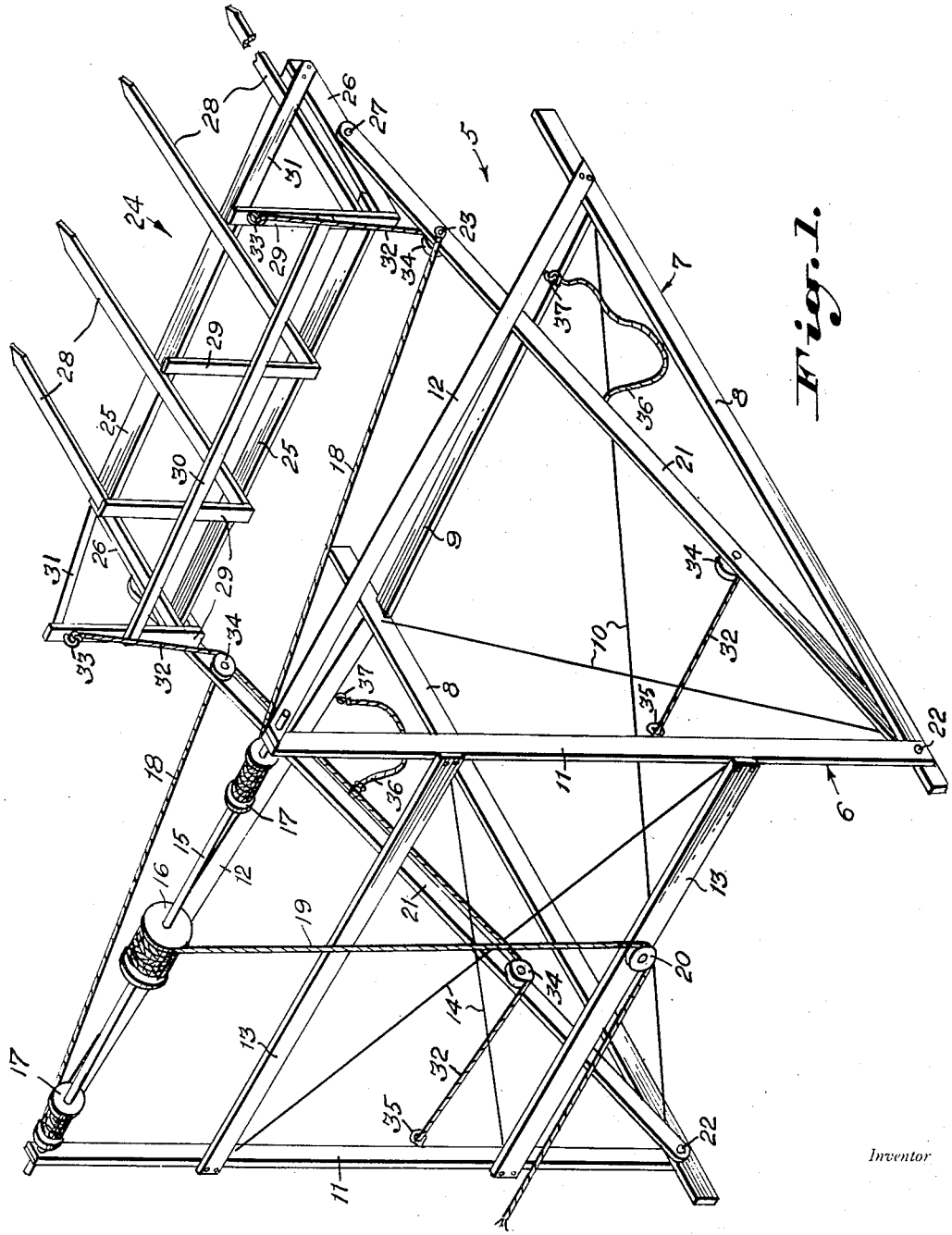
Figure 1 is a perspective view showing the hay stacker with the stacker head or fork in a partially elevated position.

Referring more specifically to the drawings, the hay stacker in its entirety is designated generally 5, and includes a supporting frame, designated generally 6, having a base 7 composed of substantially parallel sills 8 which are connected adjacent corresponding ends thereof by a cross brace 9 and which are connected adjacent both ends by diagonal braces 10. The sills 8, adjacent their opposite ends, are each provided with an upright 11 which uprights are secured at their lower ends to the outer sides of the sills 8. The uprights 11 are braced at their upper ends by downwardly extending diagonal braces 12 which are secured at their lower ends to the outer sides of the first mentioned ends of said sills 8. The uprights 11 are also braced by a plurality of cross braces 13 and diagonal braces 14 which additionally function as braces for the ends of the sills to which said uprights are secured.

A shaft 15 extends transversely through the upper portion of the frame 6 and has its end portions journaled in the upper portions of the uprights 11 on the apex formed by said uprights and the diagonal braces 12. The shaft 15 has an intermediate, relatively large pulley 16 fixed thereto and two smaller pulleys 17 are fixed to the shaft 15 inwardly of and adjacent the uprights 11. A cable or flexible member 18 is partially wound on each of the drums 17 and a cable or flexible member 19 is partially wound on the intermediate, larger drum 16 and in the opposite direction to the direction in which the cables 18 are wound on the drums 17. The cable 19 has its free end extending downwardly from the drum 16 on the outer sides of the braces 13 and 14 and is trained around and under a pulley 20 which is fastened rotatably to the lower brace 13 and extends laterally therefrom to beyond one side of the frame 6.

A pair of supporting arms 21 are swingable supported in the frame 6, one of said supporting arms being swingably connected at an end thereof on the inner side of each of the sills 8 on a pivot 22 at adjacent the point where the upright 11 rises from said sill. The arms 21 extend along the inner sides of the sills to slightly beyond the opposite ends of said sills. The opposite, free ends of the cables or flexible members 18 are anchored to the arms 21 at points 23 near the free ends of said arms and on the outer sides thereof.

A stacker head or fork, designated generally 24, is pivotally supported between the free ends of the arms 21 and includes a frame composed of longitudinal members 25 and transverse end members 26. Said end members 26 are disposed against the inner sides of the free ends of the arms 21 and are pivotally connected at 27 intermediate of their ends thereto so that said frame projects outwardly from the free ends of the arms 21 as well as inwardly with respect thereto. The fork or head 24 includes a plurality of tines or teeth 28 which are fastened at their inner ends to the longitudinal members 25 and transversely thereof and which project outwardly from the outermost member 25. The inner longitudinal edge of the stacker head frame is provided with a plurality of spaced uprights 29 which are connected by a longitudinal brace 30 which is disposed above the level of the teeth or tines 28. The end uprights 29 which are located contiguous with the end frame members 26 are reinforced by diagonal braces 31 which extend between the upper ends thereof and the outer ends of said end members 26.

An end of a flexible member or cable 32 is fastened to an eye 33 which projects rearwardly from each of the end uprights 29 and adjacent its upper end. Said flexible members 32 extend downwardly from the eyes 33 and along the inner sides of the supporting arms 21 and are each trained under a plurality of pulleys 34 which are supported by and journaled on the inner sides of the arms 21. The opposite ends of the flexible members 32 extend upwardly from the arms 21 and are anchored by eye fastenings 35 to the uprights 11 substantially above the level of the sills 8. A short flexible member or cable 36 is fastened at an end thereof to an intermediate portion of each of the cables 32 and between the pulleys 34 over which said cable is trained and said flexible members 36 are connected at their opposite ends by eye fastenings 37 to the diagonal braces 12 adjacent the lower ends thereof.

Assuming that the fork 24 is disposed in its lowermost horizontal position resting on the ground as illustrated in Figure 2, a fork load of hay as indicated at 38 is swept onto the fork or stacker head 24 in any suitable manner as by means of a conventional hay sweep, not shown. A pull is then exerted on the end of the cable 19 which extends laterally from the pulley 20 for unwinding said cable from the drum 16 to cause the drum and shaft 15 to be revolved in a direction for revolving the drums 17 for winding the cables 18 thereon. This will cause the arms 21 to swing upwardly as a unit on their pivots 22 toward the shaft 15 carrying with them the fork or stacker head 24 on which is supported the load of hay 38. During the initial movement of the fork or head 24 from its position of Figure 2 to and beyond its position of Figure 1 and to adjacent its position of Figure 3, the pulleys 34 which are located adjacent the eye fastenings 35 will be moving toward said fastenings to produce slack in the cables 32 as the arms 21 swing upwardly so that the fork or head 24 can pivot in a clockwise direction on its pivot 27 to remain in substantially a horizontal position. During this movement the cables 36 will be slack and will remain slack until the supporting arms 21 approach their fully raised positions of Figure 3. As the supporting arms 21 approach their positions of Figure 3 the cables 32 will have moved sufficiently away from the fastenings 37 to take up the slack in the flexible members or cables 36 so that said cables 36 will exert a sudden pull on the cables 32 as the arms approach their positions of Figure 3 to swing the fork or head 24 suddenly in a counterclockwise direction on its pivot 27 from a horizontal position through an arc of nearly 180° to throw the load of hay 38 off of the fork and onto the top of a haystack 39 adjacent which the stacker 5 is disposed. When the fork or head 24 is thus swung counterclockwise on its pivot 27 the portion of the load of hay 38 which is disposed adjacent the outer ends of the tines 28 will obviously be thrown with greater force than the hay which is located adjacent the pivot 27 so that the force thus exerted against different portions of the load 38 will be varied for throwing the hay substantially uniformly over the top of the stack 39 and for separating the load 38 as it is thrown from the fork to thereby greatly facilitate subsequently pitching the hay from the stack 39 and to insure that successive loads of hay 38 will be substantially equally distributed over the top of the stack 39 as it is being formed by the stacker 5.

Various modifications and changes are contemplated and may obviously be resorted to, without departing from the spirit or scope of the invention as hereinafter defined by the appended claims.

I claim as my invention:

1. A hay stacker comprising a frame, a pair of arms swingably supported at corresponding ends thereof in a base portion of the frame, a stacker head or fork pivotally mounted between the free ends of said arms, means for swinging said arms upwardly from substantially a horizontal position to substantially a vertical position, and means for supporting said stacker head in substantially a horizontal position during the upward swinging movement of the arms and for rapidly swinging the fork or stacker head about its pivot on the arms upwardly and over to an inverted position as the arms approach the uppermost position of their movement for pitching the load from the fork or stacker head, said last mentioned means comprising a flexible member having one end anchored to the frame and its opposite end anchored to said fork, pulleys carried by one of the arms beneath which said flexible member is trained, said first mentioned anchored end of the flexible member being disposed above the pivot point of the arms and frame to slacken off the flexible member as the arms are swung upwardly to permit the fork or stacker head to turn on its pivot to the arms for maintaining it in substantially a horizontal position, and flexible means connected to said flexible member and anchored to a portion of the frame for exerting a pull on the flexible member as the arms approach the upper extremities of their movement for swinging the fork or stacker head in the opposite direction and to substantially an inverted position for throwing the load therefrom.

2. A hay stacker comprising a frame, a pair of arms swingably supported at corresponding ends thereof in a base portion of the frame, a stacker head or fork pivotally mounted between the free ends of said arms, means for swinging said arms upwardly from substantially a horizontal position to substantially a vertical position, and means for supporting said stacker head in substantially a horizontal position during the upward swinging movement of the arms and for rapidly swinging the fork or stacker head about its pivot on the arms upwardly and over to an inverted position as the arms approach the uppermost position of their movement for pitching the load from the fork or stacker head, said last mentioned means comprising a flexible member having one end anchored to the frame and its opposite end anchored to said fork, pulleys carried by one of the arms beneath which said flexible member is trained, said first mentioned anchored end of the flexible member being disposed above the pivot point of the arms and frame to slacken off the flexible member as the arms are swung upwardly to permit the fork or stacker head to turn on its pivot to the arms for maintaining it in substantially a horizontal position, and flexible means connected to said flexible member and anchored to a portion of the frame for exerting a pull on the flexible member as the arms approach the upper extremities of their movement for swinging the fork or stacker head in the opposite direction and to substantially an inverted position for throwing the load therefrom, said fork having an upwardly extending rear portion disposed inwardly of the pivot of the fork and at a right angle to the remainder of the fork, and said flexible member having its last mentioned end connected to said rear portion adjacent the upper end thereof.

No references cited.